United States Patent
Candelore (10) Patent No.: US 7,925,016 B2
(45) Date of Patent: *Apr. 12, 2011

(54) METHOD AND APPARATUS FOR DESCRAMBLING CONTENT

(75) Inventor: Brant L. Candelore, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 675 days.

This patent is subject to a terminal disclaimer.

(21) Appl. No.: 11/939,500

(22) Filed: Nov. 13, 2007

(65) Prior Publication Data

US 2010/0020963 A1 Jan. 28, 2010

Related U.S. Application Data

(63) Continuation of application No. 10/763,865, filed on Jan. 22, 2004, now Pat. No. 7,302,058, which is a continuation of application No. 09/497,393, filed on Feb. 3, 2000, now Pat. No. 6,697,489.

(60) Provisional application No. 60/126,805, filed on Mar. 30, 1999.

(51) Int. Cl.
*H04N 7/167* (2006.01)
*H04L 9/32* (2006.01)

(52) U.S. Cl. ......... 380/200; 380/239; 713/189; 713/192

(58) Field of Classification Search .................. 380/239, 380/241, 277–278, 200–203; 713/189, 192–194; 725/114–116

See application file for complete search history.

(56) References Cited

U.S. PATENT DOCUMENTS

| 3,852,519 A | 12/1974 | Court |
| 4,381,519 A | 4/1983 | Wilkinson et al. |
| 4,419,693 A | 12/1983 | Wilkinson |
| 4,521,853 A | 6/1985 | Guttag |
| 4,634,808 A | 1/1987 | Moerder |
| 4,700,387 A | 10/1987 | Hirata |
| 4,703,351 A | 10/1987 | Kondo |
| 4,703,352 A | 10/1987 | Kondo |
| 4,710,811 A | 12/1987 | Kondo |
| 4,722,003 A | 1/1988 | Kondo |
| 4,739,510 A | 4/1988 | Jeffers et al. |
| 4,772,947 A | 9/1988 | Kono |

(Continued)

FOREIGN PATENT DOCUMENTS

EP 0471373 2/1992

(Continued)

OTHER PUBLICATIONS

Aravind, H. et al., "Image and Video Coding Standards", *AT&T Technical Journal*, (Jan./Feb. 1993), 67-68.

(Continued)

*Primary Examiner* — Hosuk Song
(74) *Attorney, Agent, or Firm* — Blakely, Sokoloff, Taylor & Zafman LLP (57) ABSTRACT

In accordance with one embodiment, a method for securing control words is provided. The method includes receiving scrambled digital content in a descrambler integrated circuit. The method further includes receiving an encrypted control word in the descrambler integrated circuit, decrypting the encrypted control word using a key stored in a register circuit of the descrambler integrated circuit, and descrambling the scrambled digital content in the descrambler integrated circuit using the decrypted control word.

13 Claims, 9 Drawing Sheets

U.S. PATENT DOCUMENTS

| | | | |
|---|---|---|---|
| 4,785,361 | A | 11/1988 | Brotby |
| 4,788,589 | A | 11/1988 | Kondo |
| 4,815,078 | A | 3/1989 | Shimura |
| 4,845,560 | A | 7/1989 | Kondo et al. |
| 4,887,296 | A | 12/1989 | Horne |
| 4,890,161 | A | 12/1989 | Kondo |
| 4,924,310 | A | 5/1990 | von Brandt |
| 4,944,006 | A | 7/1990 | Citta et al. |
| 4,953,023 | A | 8/1990 | Kondo |
| 4,964,126 | A | 10/1990 | Musicus et al. |
| 4,995,080 | A | 2/1991 | Bestler et al. |
| 5,023,710 | A | 6/1991 | Kondo et al. |
| 5,029,207 | A * | 7/1991 | Gammie ............... 380/228 |
| 5,122,873 | A | 6/1992 | Golin |
| 5,138,659 | A | 8/1992 | Kelkar et al. |
| 5,142,537 | A | 8/1992 | Kutner et al. |
| 5,144,662 | A | 9/1992 | Welmer |
| 5,159,452 | A | 10/1992 | Kinoshita et al. |
| 5,196,931 | A | 3/1993 | Kondo |
| 5,208,816 | A | 5/1993 | Seshardi et al. |
| 5,237,424 | A | 8/1993 | Nishino et al. |
| 5,241,381 | A | 8/1993 | Kondo |
| 5,247,575 | A | 9/1993 | Sprague et al. |
| 5,258,835 | A | 11/1993 | Kato |
| 5,325,432 | A | 6/1994 | Gardeck et al. |
| 5,327,502 | A | 7/1994 | Katata et al. |
| 5,359,694 | A | 10/1994 | Concordel |
| 5,379,072 | A | 1/1995 | Kondo |
| 5,398,078 | A | 3/1995 | Masuda et al. |
| 5,414,852 | A | 5/1995 | Kramer et al. |
| 5,416,651 | A | 5/1995 | Uetake et al. |
| 5,416,847 | A | 5/1995 | Boze |
| 5,420,866 | A | 5/1995 | Wasilewski |
| 5,428,403 | A | 6/1995 | Andrew et al. |
| 5,434,716 | A | 7/1995 | Sugiyama et al. |
| 5,438,369 | A | 8/1995 | Citta et al. |
| 5,455,862 | A | 10/1995 | Hoskinson |
| 5,469,216 | A | 11/1995 | Takahashi et al. |
| 5,471,501 | A | 11/1995 | Parr et al. |
| 5,473,692 | A | 12/1995 | Davis |
| 5,481,554 | A | 1/1996 | Kondo |
| 5,481,627 | A | 1/1996 | Kim |
| 5,485,577 | A | 1/1996 | Eyer et al. |
| 5,528,608 | A | 6/1996 | Shimizume |
| 5,535,276 | A | 7/1996 | Ganesan |
| 5,539,823 | A | 7/1996 | Martin |
| 5,539,828 | A | 7/1996 | Davis |
| 5,555,305 | A | 9/1996 | Robinson et al. |
| 5,561,713 | A | 10/1996 | Suh |
| 5,568,552 | A | 10/1996 | Davis |
| 5,574,787 | A | 11/1996 | Ryan |
| 5,582,470 | A | 12/1996 | Yu |
| 5,583,576 | A | 12/1996 | Perlman et al. |
| 5,598,214 | A | 1/1997 | Kondo et al. |
| 5,600,721 | A | 2/1997 | Kitazato |
| 5,606,359 | A | 2/1997 | Youden et al. |
| 5,608,448 | A | 3/1997 | Smoral et al. |
| 5,615,265 | A | 3/1997 | Coutrot |
| 5,617,333 | A | 4/1997 | Oyamada et al. |
| 5,625,715 | A | 4/1997 | Trew et al. |
| 5,629,981 | A | 5/1997 | Nerlikar |
| 5,652,795 | A | 7/1997 | Dillon et al. |
| 5,663,764 | A | 9/1997 | Kondo et al. |
| 5,666,293 | A | 9/1997 | Metz et al. |
| 5,696,906 | A | 12/1997 | Peters et al. |
| 5,703,889 | A | 12/1997 | Shimoda et al. |
| 5,717,814 | A | 2/1998 | Abecassis |
| 5,726,702 | A | 3/1998 | Hamaguchi et al. |
| 5,732,346 | A | 3/1998 | Lazaridis et al. |
| 5,742,680 | A | 4/1998 | Wilson |
| 5,742,681 | A | 4/1998 | Giachetti et al. |
| 5,751,280 | A | 5/1998 | Abbott et al. |
| 5,751,743 | A | 5/1998 | Takizawa |
| 5,751,813 | A | 5/1998 | Dorenbos |
| 5,754,650 | A | 5/1998 | Katznelson |
| 5,757,417 | A | 5/1998 | Aras et al. |
| 5,757,909 | A | 5/1998 | Park |
| 5,768,539 | A | 6/1998 | Metz et al. |
| 5,784,464 | A | 7/1998 | Akiyama et al. |
| 5,796,786 | A | 8/1998 | Lee |
| 5,796,829 | A | 8/1998 | Newby et al. |
| 5,796,840 | A | 8/1998 | Davis |
| 5,802,176 | A | 9/1998 | Audebert |
| 5,805,700 | A | 9/1998 | Nardone et al. |
| 5,805,712 | A | 9/1998 | Davis |
| 5,805,762 | A | 9/1998 | Boyce et al. |
| 5,809,147 | A | 9/1998 | De Lange et al. |
| 5,815,146 | A | 9/1998 | Youden et al. |
| 5,818,934 | A | 10/1998 | Cuccia |
| 5,825,879 | A | 10/1998 | Davis |
| 5,850,218 | A | 12/1998 | LaJoie et al. |
| 5,852,290 | A | 12/1998 | Chaney |
| 5,852,470 | A | 12/1998 | Kondo et al. |
| 5,870,474 | A | 2/1999 | Wasiliewski et al. |
| 5,894,320 | A | 4/1999 | Vancelette |
| 5,894,516 | A | 4/1999 | Brandenburg |
| 5,915,018 | A | 6/1999 | Aucsmith |
| 5,922,048 | A | 7/1999 | Emura |
| 5,933,500 | A | 8/1999 | Blatter et al. |
| 5,940,738 | A | 8/1999 | Rao |
| 5,949,877 | A | 9/1999 | Traw et al. |
| 5,949,881 | A | 9/1999 | Davis et al. |
| 5,973,679 | A | 10/1999 | Abbott et al. |
| 5,973,722 | A | 10/1999 | Wakai et al. |
| 5,999,698 | A | 12/1999 | Nakai et al. |
| 6,005,561 | A | 12/1999 | Hawkins et al. |
| 6,011,849 | A | 1/2000 | Orrin |
| 6,012,144 | A | 1/2000 | Pickett |
| 6,021,199 | A | 2/2000 | Ishibashi |
| 6,021,201 | A | 2/2000 | Bakhle et al. |
| 6,028,932 | A | 2/2000 | Park |
| 6,049,613 | A | 4/2000 | Jakobsson |
| 6,055,314 | A | 4/2000 | Spies et al. |
| 6,057,872 | A | 5/2000 | Candelore |
| 6,058,186 | A | 5/2000 | Enari |
| 6,058,192 | A | 5/2000 | Guralnick et al. |
| 6,061,451 | A | 5/2000 | Muratani et al. |
| 6,064,748 | A | 5/2000 | Hogan |
| 6,065,050 | A | 5/2000 | DeMoney |
| 6,069,647 | A | 5/2000 | Sullivan et al. |
| 6,072,873 | A | 6/2000 | Bewick |
| 6,073,122 | A | 6/2000 | Wool |
| 6,088,450 | A | 7/2000 | Davis et al. |
| 6,105,134 | A | 8/2000 | Pinder et al. |
| 6,118,873 | A | 9/2000 | Lotspiech et al. |
| 6,134,237 | A | 10/2000 | Brailean et al. |
| 6,134,551 | A | 10/2000 | Aucsmith |
| 6,138,237 | A | 10/2000 | Ruben et al. |
| 6,154,206 | A | 11/2000 | Ludtke |
| 6,157,719 | A | 12/2000 | Wasilewski et al. |
| 6,181,334 | B1 | 1/2001 | Freeman et al. |
| 6,185,369 | B1 | 2/2001 | Ko et al. |
| 6,185,546 | B1 | 2/2001 | Davis |
| 6,189,096 | B1 | 2/2001 | Haverty |
| 6,192,131 | B1 | 2/2001 | Geer, Jr. et al. |
| 6,199,053 | B1 | 3/2001 | Herbert et al. |
| 6,204,843 | B1 | 3/2001 | Freeman et al. |
| 6,209,098 | B1 | 3/2001 | Davis |
| 6,215,484 | B1 | 4/2001 | Freeman et al. |
| 6,222,924 | B1 | 4/2001 | Salomaki |
| 6,223,290 | B1 | 4/2001 | Larsen et al. |
| 6,226,618 | B1 | 5/2001 | Downs et al. |
| 6,229,895 | B1 | 5/2001 | Son et al. |
| 6,230,194 | B1 | 5/2001 | Frailong et al. |
| 6,230,266 | B1 | 5/2001 | Perlman et al. |
| 6,240,553 | B1 | 5/2001 | Son et al. |
| 6,246,720 | B1 | 6/2001 | Kutner et al. |
| 6,256,747 | B1 | 7/2001 | Inohara et al. |
| 6,263,506 | B1 | 7/2001 | Ezaki et al. |
| 6,266,416 | B1 | 7/2001 | Sigbjornsen et al. |
| 6,266,480 | B1 | 7/2001 | Ezaki et al. |
| 6,272,538 | B1 | 8/2001 | Holden et al. |
| 6,278,783 | B1 | 8/2001 | Kocher et al. |
| 6,289,455 | B1 | 9/2001 | Kocher et al. |
| 6,292,568 | B1 | 9/2001 | Akins et al. |
| 6,292,892 | B1 | 9/2001 | Davis |
| 6,307,939 | B1 | 10/2001 | Vigarie |

| | | |
|---|---|---|
| 6,311,012 B1 | 10/2001 | Cho et al. |
| 6,311,130 B1 | 10/2001 | Huang |
| 6,351,538 B1 | 2/2002 | Uz |
| 6,351,813 B1 | 2/2002 | Mooney et al. |
| 6,377,589 B1 | 4/2002 | Knight et al. |
| 6,389,533 B1 | 5/2002 | Davis et al. |
| 6,389,537 B1 | 5/2002 | Davis et al. |
| 6,415,031 B1 | 7/2002 | Colligan et al. |
| 6,415,101 B1 | 7/2002 | deCarmo et al. |
| 6,430,361 B2 | 8/2002 | Lee |
| 6,449,718 B1 | 9/2002 | Rucklidge et al. |
| 6,452,923 B1 | 9/2002 | Gerszberg et al. |
| 6,456,985 B1 | 9/2002 | Ohtsuka |
| 6,459,427 B1 | 10/2002 | Mao et al. |
| 6,466,671 B1 | 10/2002 | Maillard et al. |
| 6,477,649 B2 | 11/2002 | Kambayashi et al. |
| 6,505,032 B1 | 1/2003 | McCorkle et al. |
| 6,510,554 B1 | 1/2003 | Gordon et al. |
| 6,519,248 B1 | 2/2003 | Valko |
| 6,519,693 B1 | 2/2003 | Debey |
| 6,526,144 B2 | 2/2003 | Markandey et al. |
| 6,529,526 B1 | 3/2003 | Schneidewend |
| 6,543,053 B1 | 4/2003 | Li et al. |
| 6,549,229 B1 | 4/2003 | Kirby et al. |
| 6,557,031 B1 | 4/2003 | Mimura et al. |
| 6,587,561 B1 | 7/2003 | Sered et al. |
| 6,590,979 B1 | 7/2003 | Ryan |
| 6,640,145 B2 | 10/2003 | Hoffberg et al. |
| 6,654,389 B1 | 11/2003 | Brunheroto et al. |
| 6,678,740 B1 | 1/2004 | Rakib et al. |
| 6,681,326 B2 | 1/2004 | Son et al. |
| 6,697,944 B1 | 2/2004 | Jones et al. |
| 6,707,696 B1 | 3/2004 | Turner et al. |
| 6,772,340 B1 | 8/2004 | Peinado et al. |
| 6,788,690 B2 | 9/2004 | Harri |
| 6,826,185 B1 | 11/2004 | Montanaro et al. |
| 6,904,520 B1 | 6/2005 | Rosset et al. |
| 6,931,534 B1 | 8/2005 | Javed |
| 6,964,060 B2 | 11/2005 | Kamperman et al. |
| 6,976,166 B2 | 12/2005 | Herley et al. |
| 7,039,802 B1 | 5/2006 | Eskicioglu et al. |
| 7,039,938 B2 | 5/2006 | Candelore |
| 7,058,806 B2 | 6/2006 | Smeets et al. |
| 7,120,250 B2 | 10/2006 | Candelore |
| 7,124,303 B2 | 10/2006 | Candelore et al. |
| 7,139,398 B2 | 11/2006 | Candelore et al. |
| 7,151,831 B2 | 12/2006 | Candelore et al. |
| 7,155,012 B2 | 12/2006 | Candelore et al. |
| 7,203,311 B1 | 4/2007 | Kahn et al. |
| 7,333,489 B1 | 2/2008 | Nelson et al. |
| 7,353,541 B1 | 4/2008 | Ishibashi et al. |
| 2001/0030959 A1 | 10/2001 | Ozawa et al. |
| 2002/0046406 A1 | 4/2002 | Chelehmal et al. |
| 2002/0059425 A1 | 5/2002 | Belfiore et al. |
| 2002/0066101 A1 | 5/2002 | Gordon et al. |
| 2002/0083438 A1 | 6/2002 | So et al. |
| 2002/0108035 A1 | 8/2002 | Herley et al. |
| 2002/0129243 A1 | 9/2002 | Nanjundiah |
| 2002/0150239 A1 | 10/2002 | Carny et al. |
| 2002/0170053 A1 | 11/2002 | Peterka et al. |
| 2002/0194613 A1 | 12/2002 | Unger |
| 2002/0196939 A1 | 12/2002 | Unger et al. |
| 2003/0063615 A1 | 4/2003 | Luoma et al. |
| 2003/0081630 A1 | 5/2003 | Mowery et al. |
| 2003/0097662 A1 | 5/2003 | Russ et al. |
| 2003/0123664 A1 | 7/2003 | Pedlow, Jr. et al. |
| 2003/0123849 A1 | 7/2003 | Nallur et al. |
| 2003/0133570 A1 | 7/2003 | Candelore et al. |
| 2003/0152224 A1 | 8/2003 | Candelore et al. |
| 2003/0156718 A1 | 8/2003 | Candelore et al. |
| 2003/0159139 A1 | 8/2003 | Candelore et al. |
| 2003/0159140 A1 | 8/2003 | Candelore |
| 2003/0159152 A1 | 8/2003 | Lin et al. |
| 2003/0174844 A1 | 9/2003 | Candelore |
| 2003/0190054 A1 | 10/2003 | Troyansky et al. |
| 2003/0198223 A1 | 10/2003 | Mack et al. |
| 2003/0222994 A1 | 12/2003 | Dawson |
| 2003/0226149 A1 | 12/2003 | Chun et al. |
| 2004/0003008 A1 | 1/2004 | Wasilewski et al. |
| 2004/0049690 A1 | 3/2004 | Candelore et al. |
| 2004/0049694 A1 | 3/2004 | Candelore |
| 2004/0064688 A1 | 4/2004 | Jacobs |
| 2004/0068440 A1 | 4/2004 | Porato |
| 2004/0073917 A1 | 4/2004 | Pedlow, Jr. et al. |
| 2004/0078575 A1 | 4/2004 | Morten et al. |
| 2004/0088552 A1 | 5/2004 | Candelore |
| 2004/0088558 A1 | 5/2004 | Candelore |
| 2004/0123094 A1 | 6/2004 | Sprunk |
| 2004/0139337 A1 | 7/2004 | Pinder et al. |
| 2004/0141314 A1 | 7/2004 | Vautrin et al. |
| 2004/0158721 A1 | 8/2004 | Candelore |
| 2004/0165586 A1 | 8/2004 | Read et al. |
| 2004/0181666 A1 | 9/2004 | Candelore |
| 2004/0187161 A1 | 9/2004 | Cao |
| 2005/0004875 A1 | 1/2005 | Kontio et al. |
| 2005/0036067 A1 | 2/2005 | Ryal et al. |
| 2005/0063541 A1 | 3/2005 | Candelore |
| 2005/0094808 A1 | 5/2005 | Pedlow et al. |
| 2005/0094809 A1 | 5/2005 | Pedlow et al. |
| 2005/0097596 A1 | 5/2005 | Pedlow |
| 2005/0097597 A1 | 5/2005 | Pedlow et al. |
| 2005/0097598 A1 | 5/2005 | Pedlow et al. |
| 2005/0097614 A1 | 5/2005 | Pedlow et al. |
| 2005/0102702 A1 | 5/2005 | Candelore et al. |
| 2005/0129233 A1 | 6/2005 | Pedlow |
| 2005/0141713 A1 | 6/2005 | Genevois |
| 2005/0144646 A1 | 6/2005 | Lecrom et al. |
| 2005/0169473 A1 | 8/2005 | Candelore |
| 2005/0192904 A1 | 9/2005 | Candelore |
| 2006/0026926 A1 | 2/2006 | Triel et al. |
| 2006/0029060 A1 | 2/2006 | Pister |
| 2006/0115083 A1 | 6/2006 | Candelore et al. |
| 2006/0130119 A1 | 6/2006 | Candelore et al. |
| 2006/0130121 A1 | 6/2006 | Candelore et al. |
| 2006/0153379 A1 | 7/2006 | Candelore et al. |
| 2006/0168616 A1 | 7/2006 | Candelore |
| 2006/0174264 A1 | 8/2006 | Candelore |

FOREIGN PATENT DOCUMENTS

| | | |
|---|---|---|
| EP | 0527611 | 7/1992 |
| EP | 0558016 | 2/1993 |
| EP | 0596826 | 4/1993 |
| EP | 0610587 | 12/1993 |
| EP | 0680209 | 4/1995 |
| EP | 0 674 440 | 9/1995 |
| EP | 0 674 441 | 9/1995 |
| EP | 0833517 | 4/1998 |
| EP | 0866615 | 9/1998 |
| JP | 7067028 | 3/1995 |
| JP | 11159162 | 6/1999 |
| JP | 11243534 | 10/2002 |
| WO | WO8607224 | 12/1986 |
| WO | WO-9410775 | 5/1994 |
| WO | WO9738530 | 10/1997 |
| WO | WO-0031964 | 6/2000 |
| WO | WO-0178386 | 10/2001 |

OTHER PUBLICATIONS

Gonzalez, R. C., et al., "Digital Image Processing", *Addison Wesley Publishing Company, Inc.*, (1992), 346-348.

Kim, et al., "Bit Rate Reduction Algorithm for a Digital VCR", *IEEE Transactions on Consumer Electronics*, vol. 37, No. 3, (Aug. 1, 1992), 267-274.

Kondo, et al., "A New Concealment Method for Digital VCRs", *IEEE Visual Signal Processing and Communication*, Melbourne, Australia, (Sep. 1993), 20-22.

Kondo, et al., "Adaptive Dynamic Range Coding Scheme for Future Consumer Digital VTR", 219-226 (1991).

Kondo, et al., "Adaptive Dynamic Range Coding Scheme for Future HDTV Digital VTR", *Sony Corporation*, (1991).

Menezes, Alfred J., et al., "Handbook of Applied Cryptography", *CRC Press*, 551-553, (Oct. 1996).

NHK Laboratories Note, "Error Correction, Concealment and Shuffling", No. 424, (Mar. 1994), 29-44.

Park, et al., "A Simple Concealment for ATM Bursty Cell Loss", *IEEE Transactions on Consumer Electronics*, No. 3, (Aug. 1993), 704-709.

Tom, et al., "Packet Video for Cell Loss Protection Using Deinterleaving and Scrambling", *ICASSP 91: 1991 International Conference on Acoustics, Speech and Signal Processing*, vol. 4, (Apr. 1991), 2857-2860.

Zhu, et al., "Coding and Cell-Loss Recovery in DCT-Based Packet Video", *IEEE Transactions on Circuits and Systems for Video Technology*, No. 3, NY, (Jun. 3, 1993).

*International Search Report*, International Application No. PCT/US98/22347, mailed Mar. 16, 1999.

*International Search Report*, International Application No. PCT/US95/22531, mailed Apr. 1, 1999.

*International Search Report*, International Application No. PCT/US95/22411, mailed Feb. 25, 1999.

"MPEG-2 Digital Broadcast Pocket Guide", vol. 6 Revised, *Aeterna, LLC.*, Germantown, Maryland USA., (2001), 1-59.

Menezes, Alfred J., et al., "Handbook of Applied Cryptography", *CRC Press*, (Oct. 1996), 551-553.

\* cited by examiner

| BASIC TIER
CNN, HLN, TURNER, HISTORY, COURTROOM | BASIC TIER SERVICE KEY |

| MEDIUM TIER
STARZ, HITS, DISNEY, NICKELODEON | MEDIUM TIER SERVICE KEY |

| ADVANCED TIER #1
HBO, SHOWTIME, COMEDY | ADVANCE TIER #1 SERVICE KEY |

METHOD AND APPARATUS FOR DESCRAMBLING CONTENT

CLAIM OF PRIORITY

This application is a divisional of U.S. patent application Ser. No. 10/763,865, filed on Jan. 22, 2004, now U.S. Pat. No. 7,302,058, which is a continuation of U.S. patent application Ser. No. 09/497,393 filed Feb. 3, 2000, now U.S. Pat. No. 6,697,489, which claims the benefit of priority on U.S. Provisional Patent Application No. 60/126,805 filed Mar. 30, 1999.

BACKGROUND OF THE INVENTION

1. Field of the Invention

The present invention relates to digital devices. More specifically, the present invention relates to an apparatus and method for descrambling digital content in digital devices.

2. General Background

Analog communication systems are rapidly giving way to their digital counterparts. Digital television is currently scheduled to be available nationally to all consumers by the year 2002 and completely in place by the year 2006. High-definition television (HDTV) broadcasts have already begun in most major cities on a limited basis. Similarly, the explosive growth of the Internet and the World Wide Web have resulted in a correlative growth in the increase of downloadable audio-visual files, such as MP3-formatted audio files, as well as other content.

Simultaneously with, and in part due to, this rapid move to digital communications system, there have been significant advances in digital recording devices. Digital versatile disk (DVD) recorders, digital VHS video cassette recorders (D-VHS VCR), CD-ROM recorders (e.g., CD-R and CD-RW), MP3 recording devices, and hard disk-based recording units are but merely representative of the digital recording devices that are capable of producing high quality recordings and copies thereof, without the generational degradation (i.e., increased degradation between successive copies) known in the analog counterparts. The combination of movement towards digital communication systems and digital recording devices poses a concern to content providers such as the motion picture and music industries, who desire to prevent the unauthorized and uncontrolled copying of copyrighted, or otherwise protected, material.

In response, there is a movement to require service providers, such as terrestrial broadcast, cable and direct broadcast satellite (DBS) companies, and companies having Internet sites which provide downloadable content, to introduce protection schemes. Two such copy protection systems have been proposed by the 5C group of the Data Hiding Sub Group (DHSG) (5C comprising representatives of Sony, Hitachi, Toshiba, Matsushita, and Intel) and the Data Transmission Discussion Group (DTDG), which are industry committee sub-groups of the Copy Protection Technical Working Group (CPTWG). The CPTWG represents the content providers, computer and consumer electronic product manufacturers.

The DTDG Digital Transmission Copy Protection (DTCP) proposal is targeted for protecting copy-protected digital content, which is transferred between digital devices connected via a digital transmission medium such as an IEEE 1394 serial bus. Device-based, the proposal uses symmetric key cryptographic techniques to encode components of a compliant device. This allows for the authentication of any digital device prior to the transmission of the digital content in order to determine whether the device is compliant. The digital content is itself encoded prior to transmission so that unauthorized copying of the content will result in copy having an unintelligible format.

One method of encoding the content has been proposed by the DHSG, and is based on watermarking techniques. Although the main focus of the DHSG proposal has been for copy protection of digital movie and video content, particularly as applied to DVD systems, it is expected to be applicable to the copy protection of any digital content distributed electronically via digital broadcasts and networks. The watermarking techniques, which are invisible to the user, allow the incoming content to be marked in a manner that makes it extremely difficult to discern precisely how the content was encoded, and thus extremely difficult to remove or alter the watermark without damaging the content. The DHSG has determined three primary cases of detection and control that such a technology should accomplish: playback, record and generational copy control. It is anticipated that the watermarking technology will allow the content provider to specify at least whether the content is "copy never," "copy once," and "copy free" content. "Copy never" is used to mark digital content to indicate that the content is not allowed to be copied, while "copy free" indicates that the content may be copied freely and which can be marked with additional information. This is different than material that is never marked. Finally, "copy once" is used to indicate that the digital content is allowed to be copied only once. As a copy is being made, the original "copy once" content and the newly copied content are re-marked with "no more copy." Of course, other types of copy management commands may limit the playing or reproduction of such digital content; for example, to a specific period of time, duration, or number of plays or viewings.

Thus, even today, the functionality of digital devices such as set-top boxes, digital televisions, digital audio players, and similar such digital devices extends beyond their historical role of conditional access (CA), i.e., merely descrambling content to a CA-clear format for real-time viewing and/or listening, and now include constraints and conditions on the recording and playback of such digital content. For example, currently, copying of scrambled content for subsequent descrambling and viewing or listening may be permitted with the appropriate service/content provider authorization or key provided to the digital device Traditional conditional access systems for Pay-TV originated from one-way broadcast systems where a back channel was not available. A cryptographic processor, such as a smart card, in a conditional access unit, such as a set top box, for example, is generally infused with information and functionality in order to automatically grant access to programs.

For example, a smart card with a Pay-TV access control application typically receives EMMs which grant certain service entitlements. Typically, services or group keys are delivered at the same time, and if the set top box is allowed to view IPPV programs, then credit and cost limit information may be transmitted as well.

When tuning to a program, the smart card receives ECMs which describe which entitlements the smart card needs in order to grant access to the show. Hackers may attempt to manipulate both EMMs and ECMs to view programs without paying the requisite subscription fees. Not only are the EMMs and ECMs manipulated, but the hardware is attacked as well. This combination of software and hardware attacks are used to cause the smart card to decrypt scrambled programs without authorization from the provider of the programs.

Once fielded, it is hard to change the functionality of the smart cards. Mechanisms for downloading new code to smart cards are prone to attack by hackers who may try to use the same mechanisms to load pirate code into the smart card in order to steal programs. One "safe" way to upgrade the access control system is to remove existing smart cards from the field and provide new ones. However, this can be costly and logistically difficult.

SUMMARY

In accordance with one embodiment, a method for securing control words is provided. The method includes receiving scrambled digital content in a descrambler integrated circuit. The method further includes receiving an encrypted control word in the descrambler integrated circuit, decrypting the encrypted control word using a key stored in a register circuit of the descrambler integrated circuit, and descrambling the scrambled digital content in the descrambler integrated circuit using the decrypted control word.

BRIEF DESCRIPTION OF THE DRAWINGS

The present invention is illustrated by way of example and not by way of limitation in the figures of the accompanying drawings, in which like references indicate similar elements and in which.

DETAILED DESCRIPTION

Figure 1:
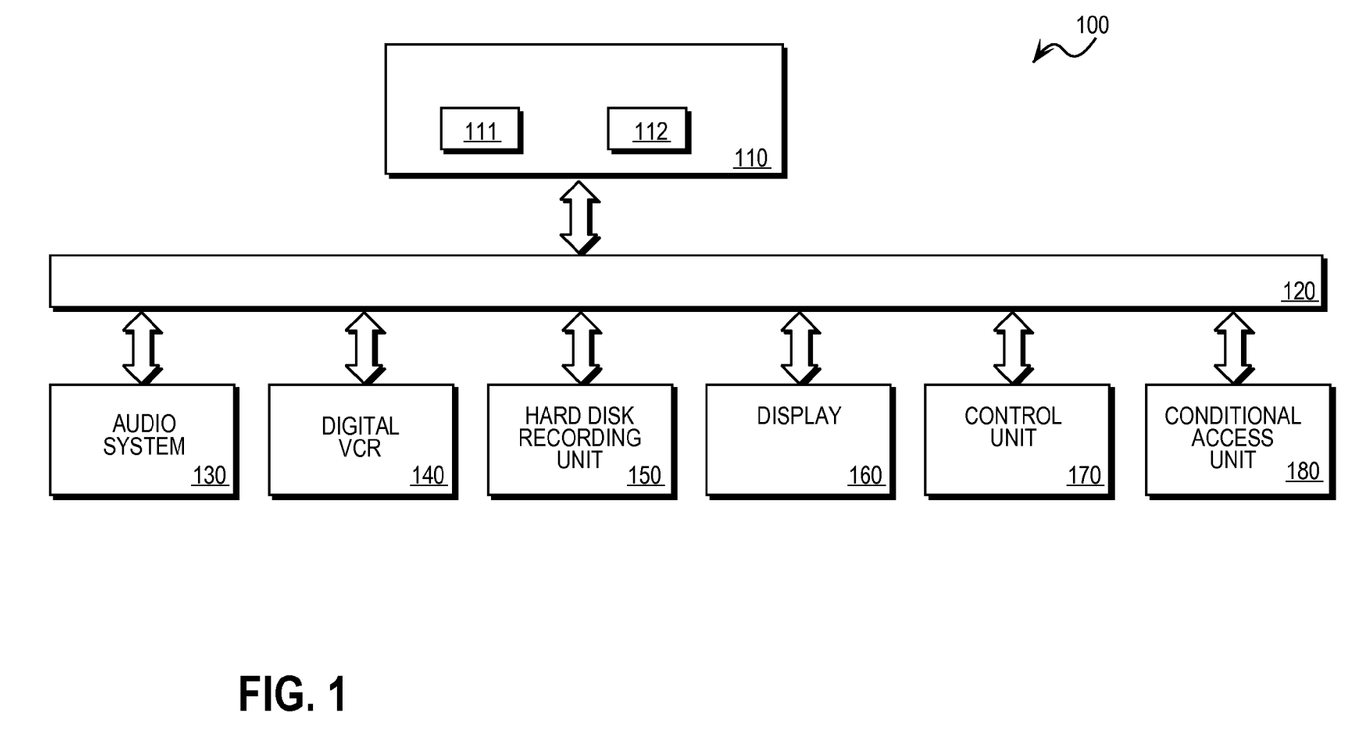
FIG. 1 is a block diagram of an exemplary entertainment system including one embodiment of a digital device.

FIG. 1 is a block diagram of an entertainment system 100 including one embodiment of the copy management system of the present invention. The entertainment system 100 includes a digital device 110 for receiving a digital bitstream including program data from one or more service providers. Such service or content providers can include terrestrial broadcasters, cable operators, direct broadcast satellite (DBS) companies, companies providing content for download via the Internet, or any similar such content and/or service provider. The program data may include system information, entitlement control messages, entitlement management messages, content, and other data, each of which will be described briefly. System information may include information on program names, time of broadcast, source, and a method of retrieval and decoding, and well as copy management commands that provide digital receivers and other devices with information that will control how and when program data may be replayed, retransmitted and/or recorded. These copy management commands may also be transmitted along with entitlement control messages (ECM), which are generally used by the conditional access unit to regulate access to a particular channel or service. Entitlement management messages (EMM) may be used to deliver privileges to the digital receiver 111 such as rights, access parameters, and descrambling keys. As known, a decryption key is generally a code that is required to restore scrambled data, and may be a function of the rights granted. Finally, content in the program data stream may include audio and video data, which may be in a scrambled or clear format.

The digital device 110 includes a digital receiver 111, which processes the incoming bitstream, extracts the program data therefrom, and provides the program data in a viewable format. Digital device 110 may be coupled to other components in the entertainment system 100 via a transmission medium 120. The transmission medium 120 operates to transmit control information and data including program data between the digital device 110 and other components in the entertainment system 100.

The entertainment system 100 may include an audio system 130 coupled to the transmission medium 120. A digital VCR 140, such as a D-VHS VCR, may also be coupled to the digital device 110 and other components of the entertainment system 100 through the transmission medium 120.

A hard disk recording unit 150 may also be coupled to digital device 110 and other components via transmission medium 120. Display 160 may include a high definition television display, a monitor or other device capable of processing digital video signals. Finally, a control unit 170 may be coupled to the transmission medium 120. The control unit 170 may be used to coordinate and control the operation of some or each of the components on the entertainment system 100.

The content of a digital program may be transmitted in scrambled form. In order for a conditional access unit to recover the scrambled content and permit a person to view the content in clear form, the unit must have the necessary access requirements associated with the scrambled content. An access requirement includes a message that describes the features that the conditional access unit must have in order to decode the scrambled content. For example, a certain key may be needed to view the content. Alternatively, a service tag associated with a given content provider may be required. Technical requirements such as a particular descrambling method may also be required and included as a part of the access requirements. The access requirements associated with a particular program may be transmitted to a conditional access unit along with the program.

When a scrambled program is received by a conditional access unit, the access requirements for the program are compared to the entitlements that the conditional access unit actually has. In order for the conditional access unit to display the scrambled content in clear form, the access requirements for the program must match the entitlements of the conditional access unit. The entitlements may state that the conditional access unit is entitled to view content from a given service provider such as HBO, for example. The entitlements may also include one or more keys needed to descramble the content. The entitlements also may define the time periods for which the conditional access unit may descramble programs. The access requirements and entitlements thus form a part of the access control system to determine whether a decoder is authorized to view a particular program.

The access requirements and entitlements can provide consumers with a variety of choices for paying for the content and gaining access to the scrambled content. These choices may include pay per play (PPP), pay per view (PPV), impulse pay per view (IPPV), time based historical, pay per time (PPT), repurchase of copy never movies, personal scrambling, and regional pay per view. Impulse pay per view is a feature which allows purchase of pay per view movies through credit that has been previously downloaded into the set top box. Purchase records may be stored and forwarded by phone to a billing center. Time based historical allows access to content that was delivered during a past time period, such as March through December, 1997, for example. The access requirements and entitlements can also provide consumers with different options for storing the scrambled content.

The access requirements may be delivered to the conditional access unit using packet identifiers (PIDs). Each PID may contain the access requirements associated with a given service or feature. The content that is delivered to a conditional access unit may also include a large number of PIDs, thus enabling special revenue features, technical features, or other special features to be performed locally.

Before receiving the content, the customer may be given a number of choices for gaining access to the content that is going to be stored to media. The customer may be required to purchase the right to access and view the content. Therefore, if the customer wants to record the content for later retrieval and viewing, the access requirements that the customer bought also need to be stored with the content.

There are different types of security architectures for conditional access units: 1) embedded; 2) split security; and 3) external security. With embedded security, the content descrambling and the key management is done all within the conditional access unit, such as a set top box for example. With split security, the descrambling is done within the set top box, but the key management is performed external to the set top box, by using a cryptographic processor such as a smart card. With external security, both the content descrambling and the key management are performed externally, such as with the NRSS-A and NRSS-B conditional access specifications. The cable industry through the Open Cable process has a modified version of NRSS-B called "Point-of-Deployment" (POD) module. The POD module has the same form factor as NRSS-B. It includes functionality for sending and receiving messages on the Out-of-Band channel. The external security type may also be split, for example, by using a PCMCIA form factor card that descrambles content, and a smart card that performs the key management.

In addition, there may be copy-protection applied to the CA descrambled transport stream. Copy-protected content will be re-scrambled across the CA module (NRSS-A, NRSS-B or POD) interface and the host. The CA element and the Host need to agree on the key used to re-encrypt this content. In one embodiment, various parameters are securely shared on each side of the interface, with the result that the same copy-protection key is derived by each party. The CA module can alternatively derive its own key and encrypt the copy protection key with the unique key of the descrambler integrated circuit in the host. The CA module can receive this unique key of the descrambler integrated circuit through an EMM or other method, e.g. factory load procedure.

Figure 2:
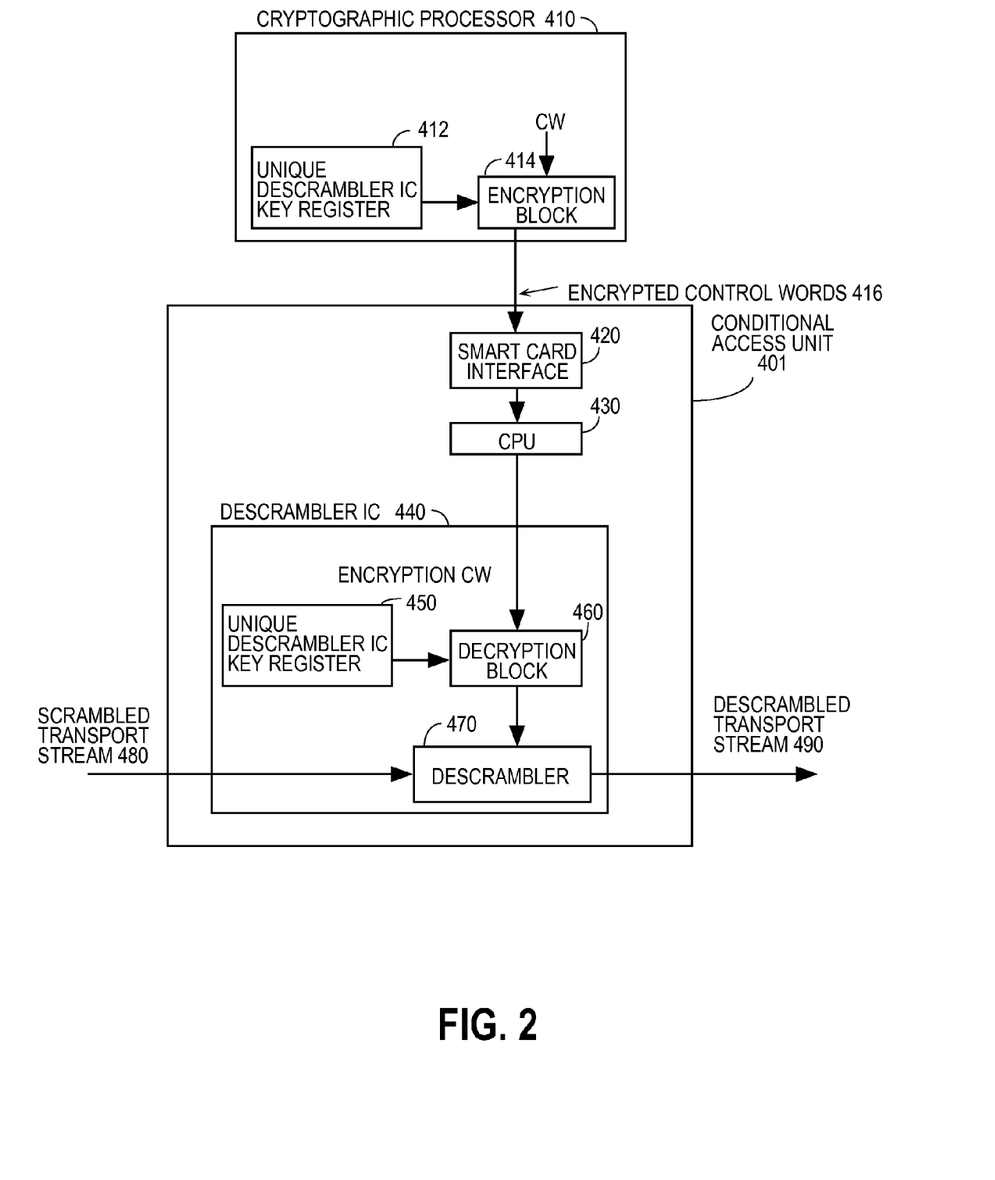
FIG. 2 is an embodiment of a conditional access unit with a smart card.

As seen in FIG. 2, an embodiment of the digital receiver 111 having the copy management system of the present invention includes a smart card interface 420. Although the smart card interface 420 may be built into the digital receiver 111, it is expected that digital receiver will have an expansion slot, such as a PCMCIA slot or Universal Services Bus (USB) slot to receive a card or device which includes the interface 420. The digital receiver 111 of this embodiment includes a CPU 430 and a descrambler integrated circuit 440.

Smart card interface 420 receives a smart card including encrypted control words for descrambling scrambled program content. Smart card 410 may transmit the control words in encrypted form to the smart card interface 420. If the content was originally scrambled using control words in addition to keys, the smart card 410 may use an encryption control key unique to unit 401 to encrypt the control words. The conditional access unit 401 will decrypt the control words and use the clear control words to descramble the program content.

Thus, FIG. 2 shows an embodiment of the split security architecture and the external architecture. In the split security architecture, conditional access unit 401 is a set top box or other type of digital device, such as device 110 shown in FIG. 1. In the external architecture, conditional access unit 401 is a NRSS-B conditional access unit. An external cryptographic processor 410, such as an ISO 7816 smart card for example, receives control words (CWs) needed to descramble a program. The smart card 410 encrypts the CWs in encryption block 414 with keys that are unique to transport descrambler integrated circuit (IC) 440.

Smart card 410 delivers the encrypted CWs to the set top CPU 430 through interface 420. The transport descrambler IC 440 in the set top box 401 will decrypt the CWs using the unique descrambler IC keys stored in register 450. The decryption block 460 then writes the decrypted CWs alternately into ODD and EVEN key registers of descrambler 470 located in the transport descrambler chip 440. The descrambler 470 then applies the ODD/EVEN CWs to the scrambled content 480 at the right time and outputs descrambled program content 490.

Thus, the transfer of the control word from the smart card to the set top box is secure, because the control word is transferred in encrypted form. The control word remains secure in the set top box because the control word is not decrypted by the non secure processor 430. The control word is only decrypted in the descrambler IC 440 that actually uses the control word, therefore, the control word is never exposed, and cannot be obtained by hackers.

Furthermore, the key used to decrypt the control word is stored in hardware in register 450 in IC 440. The register 450 cannot be hacked unless the silicon is probed and the register is destroyed. An attempt may be made to exhaustively trial the key stored in register 450 in IC 440. However, if the key is sufficiently large, the means of attack will be deemed hopeless. Furthermore, the key may only be valid for one particular unit 401, and may not be used by other units to decrypt control words, because the control words are encrypted by the smart card using a key that is unique to an associated conditional access unit 401. Therefore, the transmission of the encrypted control words from smart card 410 to conditional access unit 401 is secure and the control words are not vulnerable to theft by hackers.

The secure chip 440 does all of the secure processing of the control words. This secure chip has no CPU, no firmware, and no software. There is no complicated key hierarchy. A non CPU based descrambler chip receives the encrypted control words, applies a unique key to them, and decrypts them. No instructions, no code, no hashing, and no software is loaded into the decryption block. The decryption is performed entirely by a hardware circuit using only a single key function.

The Unique Keys may be programmed into register 450 during manufacture. For example, in one embodiment, the descrambler IC has a non-volatile Unique Key register 450 that can be written only once. When the set top, TV, or NRSS-B module 401 is manufactured, the Unique Key register 450 is programmed. In this embodiment, there is no way to either read or overwrite the original keys that were loaded into register 450. An association between the host's (401)

serial number and the Unique Key that was loaded the Descrambler IC of that host may be recorded.

When the set top 401 is manufactured and a smart card 410 is installed, the smart card 410 can receive the Unique Key associated with unit 401 at the time of pairing. From then on, the smart card is "paired" to that particular host 401. Later, if the smart card 410 is ever replaced or moved to a new host, the smart card may receive the Descrambler IC Unique Keys in an Entitlement Management Message (EMM). New smart cards with the Unique Keys already programmed into the card may also be delivered to users.

Figure 3:
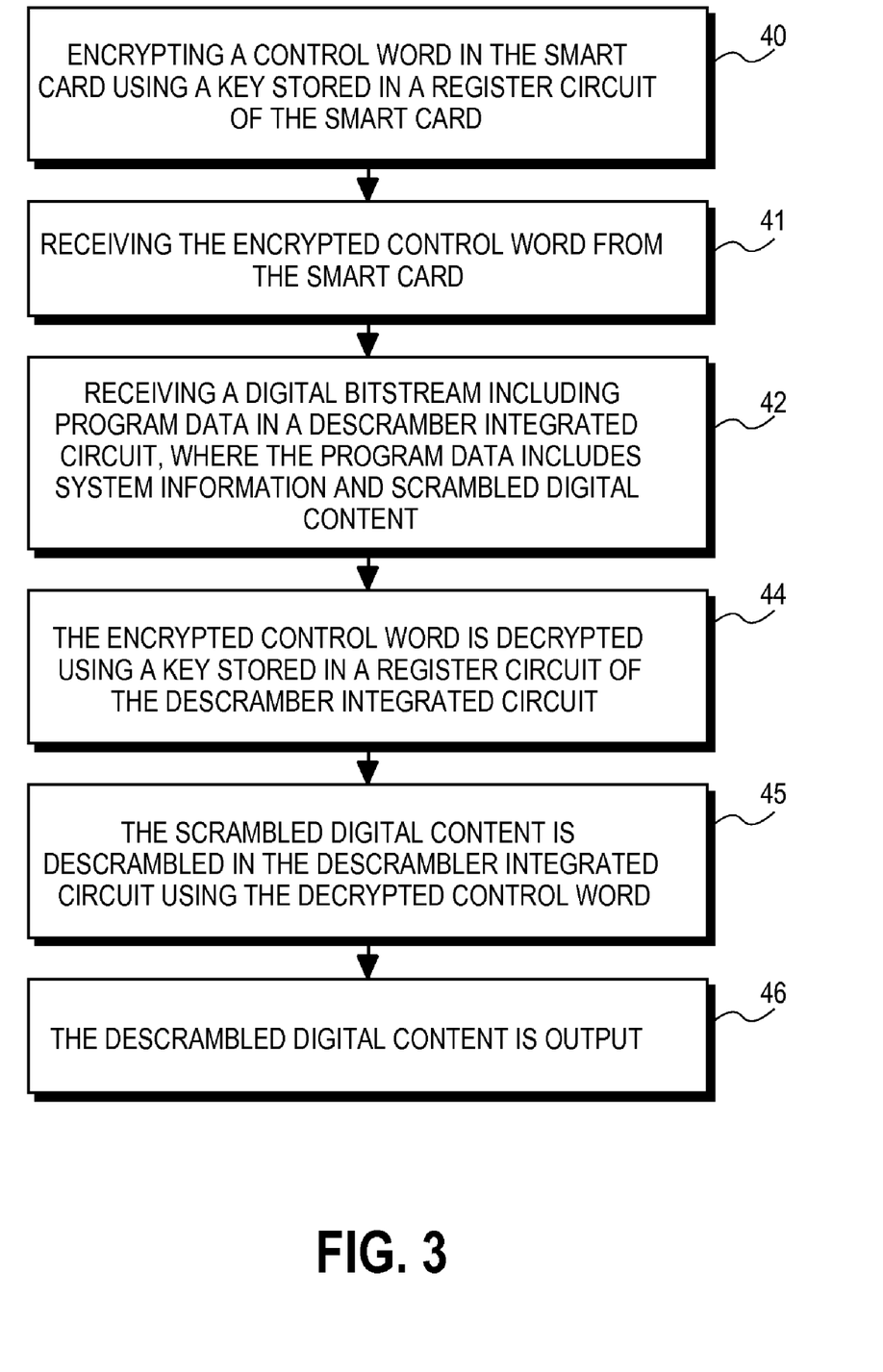
FIG. 3 is an embodiment of a method for securely transferring control words from a smart card to a conditional access unit.

A method for transferring the CWs from the smart card to the conditional access unit is shown in FIG. 3. A control word is encrypted in the smart card using a key stored in a register circuit of the smart card, step 40. The key stored in the register circuit of the smart card is associated with the key stored in the register circuit of the descrambler integrated circuit. The encrypted control word is received from the smart card, step 41. This method includes receiving a digital bitstream including program data in a descrambler integrated circuit, where the program data includes system information and scrambled digital content, step 42. The encrypted control word is decrypted using a key stored in a register circuit of the descrambler integrated circuit, step 44. The scrambled digital content is descrambled in the descrambler integrated circuit using the decrypted control word, step 45, and the descrambled digital content is output, step 46.

Figure 4:
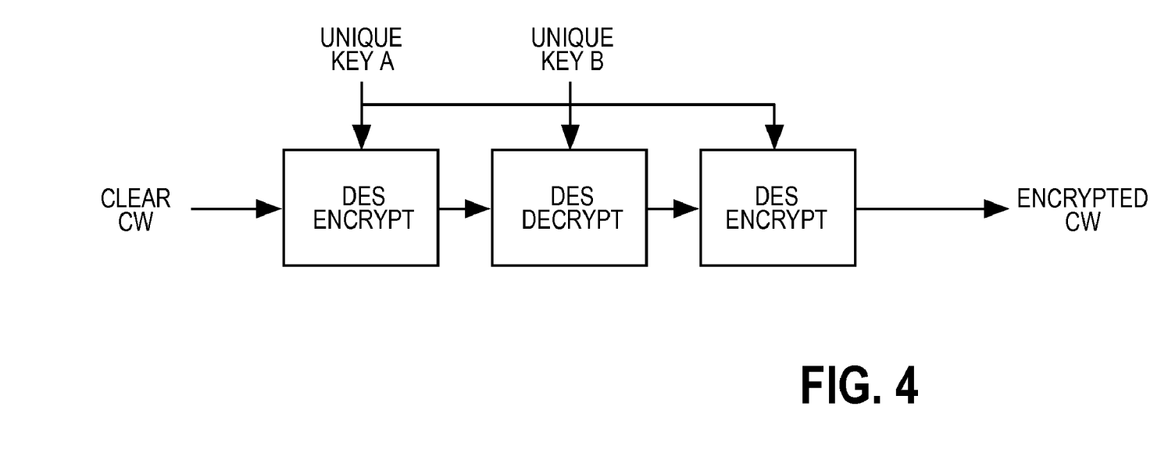
FIGS. 4 and 5 are embodiments of a method for encrypting and decrypting data.
Figure 5:
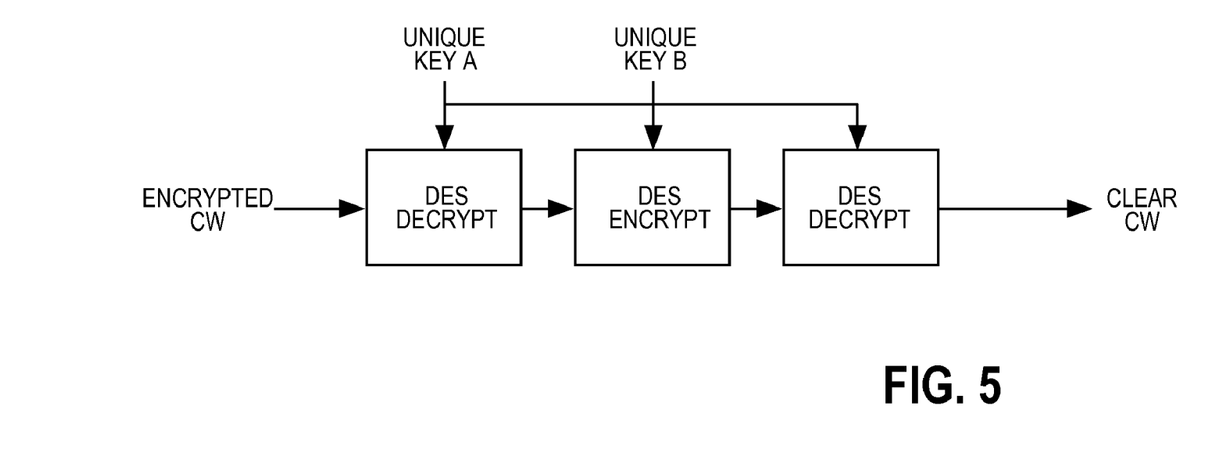
Figure 6:
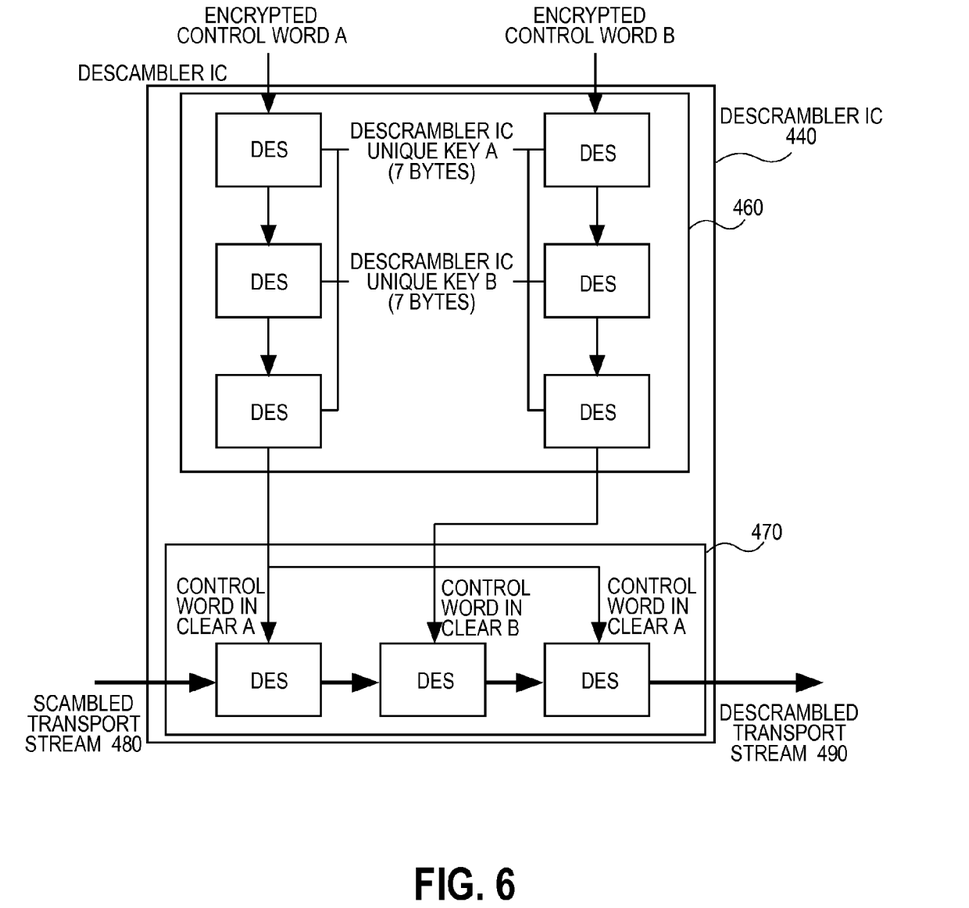
FIG. 6 is a block diagram of an embodiment of the descrambler integrated circuit.

Embodiments of the encryption and decryption functions performed by encryption block 414 and decryption block 460 are shown in FIGS. 4, 5 and 6. These operations transform the CWs based on the Unique Keys stored in registers 412 and 450. An encryption algorithm such as DES, M6, or DVB Common Scrambling Algorithm may be used. In the embodiments shown in FIGS. 4, 5 and 6, Triple DES is used. As shown in FIG. 6, the descrambler IC 440 uses Triple DES to decrypt the control words in decryption block 460. The decrypted control words are then used by descrambler 470 to descramble the program content 480 and output clear program content 490.

However, because the encryption and decryption of the CWs is local to the set top box, it is possible to phase in the deployment of increasingly more robust encryption. For example, single DES may be initially deployed, and later double or triple DES can be phased in with no consequence to already fielded paired units of set tops and smart cards. The key length of the Unique Keys may be at least as large as the descrambling Control Words, to help reduce attacks on the Unique Keys by hackers.

Figure 7:
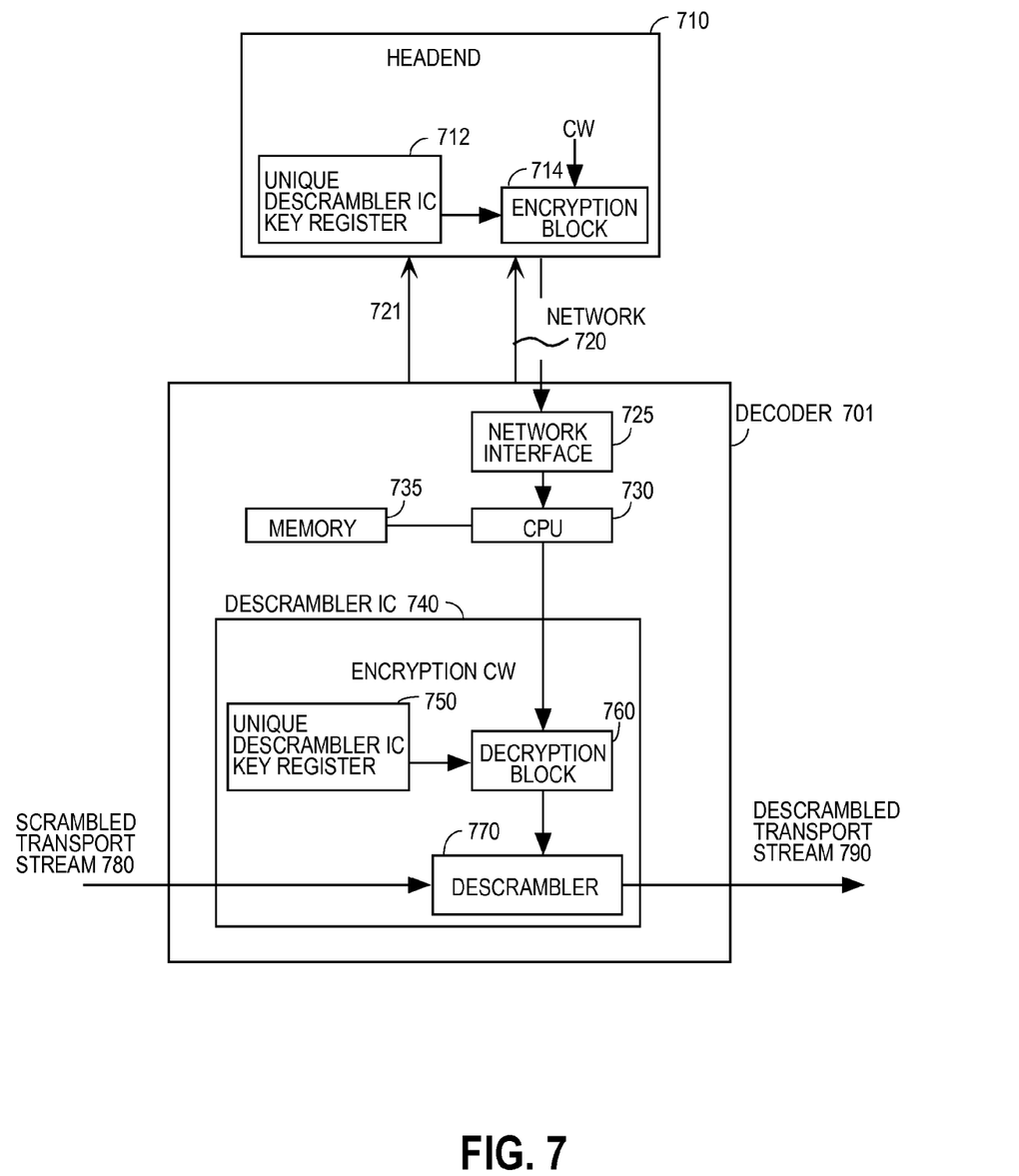
FIG. 7 is an embodiment of a headend server, network connection, and decoder.

In an alternative embodiment as shown in FIG. 7, the smart card may be replaced by the headend 710 of a one- or two-way network 720. The headend maintains the access rights for the decoder 701 instead of a local crypto microcontroller. The headend 710 can deliver Service Keys based on the Unique Keys stored in the Descrambler IC 740. The encrypted Service Keys may be stored locally in the host 701 to facilitate transitions from one channel to another. The keys are stored in encrypted form, and are loaded as needed into the Descrambler IC 740. The Keys are decrypted only in the Descrambler IC 740, by using the Descrambler IC Unique Keys stored in register 750. In one embodiment, the service keys are used as Control Words to decrypt the content directly. In another embodiment, the Service Keys are used to decrypt control words, which are received in-band with the content.

The Service Keys may be encrypted and decrypted using one of the algorithms used for the control words in the embodiments of FIGS. 2, 4, 5 and 6 described above. The algorithm used to encrypt and decrypt the Service Keys may be different than the algorithm used to scramble and descramble the program content. For example, M6 may be easier to do in software in either the smart card or the headend key server. Also, each Service Key may be encrypted using different public and proprietary encryption algorithm. These different proprietary algorithms may be considered as any-piracy measures to invalidate clone hardware.

The headend 710 can deliver Services Keys on a channel or tier of service basis in EMMs. The Services Keys are encrypted, stored locally in decoder 401 and used by the insecure processor 730 as needed when tuning to different channels. Because the set tops are fielded in high volume as compared to the headend, eliminating the cryptographic processors, such as smart cards, from the set tops can greatly reduce the cost of implementing a pay-TV system in a network.

While this embodiment works in one-way (non-IPPV) broadcast networks, it also performs in two-way, interactive networks, where the keys for a particular service are requested, such as IPPV or VOD purchases or any other non-subscription service. The return channel 721 requests the keys because the ability to grant access to a new service is performed by the headend 710 instead of a local controlling crypto-processor.

In order to avoid overload problems at the headend caused by a large number of simultaneous impulse buys of IPPV programs, a Free Preview period can be determined and IPPV programs can be marketed in advance of the actual viewing. In this embodiment, Service Keys for individual shows or movies may be requested by unit 701 and delivered ahead of time. For example, interactive networks, such as a cable system having a back channel 721 such as a DOCSIS modem or Out-of-Band transmitter/receiver can deliver the request from the unit 701 to the headend 710. Alternatively, the set top unit 701 may request the current decryption service key for each program accessed.

A controller on the network headend server 710 processes this Request for Program Key (RPK). The request may contain the decoder's Unit Address, and information needed to identify the channel to be viewed (all of which may be obtained from MPEG system and program information already processed by the insecure processor). The request may be encrypted, if need be, for non-repudiation and prevention of denial of service attacks, such as IPPV or VOD requests for example.

Figure 8:
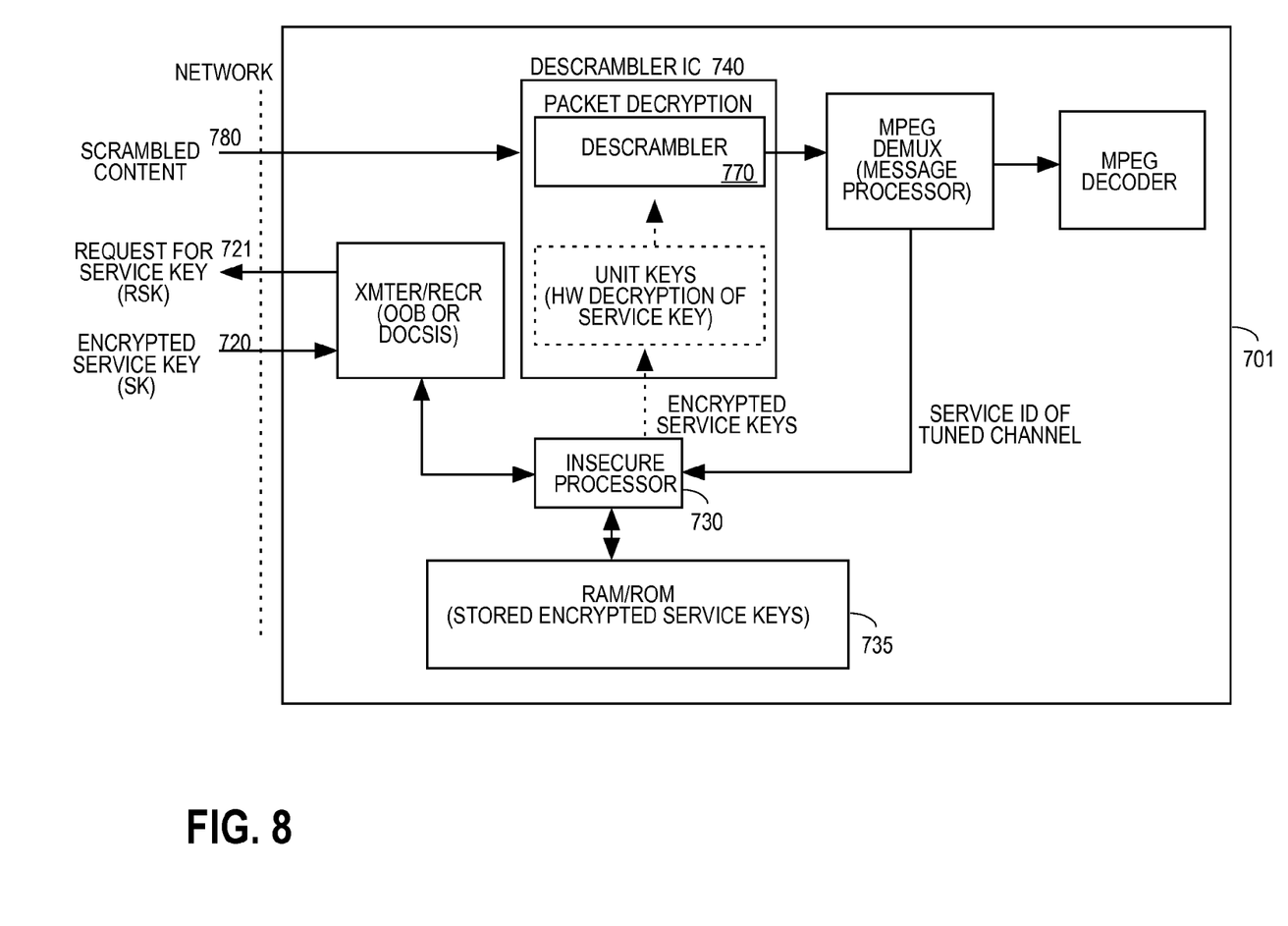
FIG. 8 is another embodiment of a decoder.

Upon receipt of the message, the key server 710 looks up the decoder 701 in the access control list (listing each unit's entitlements) and verifies the decoder's authorization. If authorized, the controller send the Service Key (encrypted under the decoder's Unique Key located in the Descrambler IC) to the unit. FIG. 8 shows an alternative embodiment of decoder 701 that can request and receive service keys.

In this embodiment, the Service Key may be valid for a certain period of time. The decoder 701 may store the key as it surfs to other services, allowing the decoder to re-access the service with a still valid key without having to request the key again. In this embodiment, the key is stored in its unit specific encrypted form (as it comes over the network from the Key Server) in the memory 735 of the insecure processor 730 (which runs the decoder).

By using the memory and the processing power of the insecure, general purpose, host processor and not a separate cryptographic processor, a great cost reduction can be achieved. Not only can the cryptographic processor be eliminated, but there is also less overhead on the part of the host processor in dealing with communication to that cryptographic processor.

The Service Key may be valid for the duration of a program or it may be valid for a period of time, e.g. 6 hours. Using a key for a longer period of time will reduce the overall number of transactions between the decoder 701 and the headend 710 because once the key is stored in decoder 701, it is available to the decoder from the decoder's memory. Depending on the duration of the current Service Key, the next key may be delivered along with the current key. Alternatively, the decoder may request the next Service Key after detecting the end of the current Service Key's valid Epoch. In one embodiment, the Service Key is valid for the duration of a user's subscription period.

The Service Key must be identified properly so that it may be applied to a channel being tuned to. When the set top box 701 tunes to a channel, it looks up the appropriate encrypted Service Key from memory 735 and writes that into the Odd/Even MPEG key register of the descrambler IC 740. As in the embodiment of FIG. 2, the secret Unique Key information may be programmed into IC 740 when decoder 701 is manufactured.

In one embodiment, the Service Keys may comprise 56-bit, 112-bit, or 168-bit keys. Table 1 shows the storage requirements for different sizes of keys.

TABLE 1

Number of Bytes to Store Independent Service Keys

| of Channels with Independent Keys | Channel ID (3 Bytes) | 16 Byte Triple DES Encrypted Service Key CURRENT | 16 Byte Triple DES Encrypted Service Key NEXT | Total Bytes |
|---|---|---|---|---|
| 20 | 60 | 320 | 320 | 700 |
| 50 | 150 | 800 | 800 | 1,750 |
| 100 | 300 | 1600 | 1600 | 3,500 |
| 200 | 600 | 3200 | 3200 | 7,000 |
| 400 | 1200 | 6400 | 6400 | 14,000 |

Figure 9:
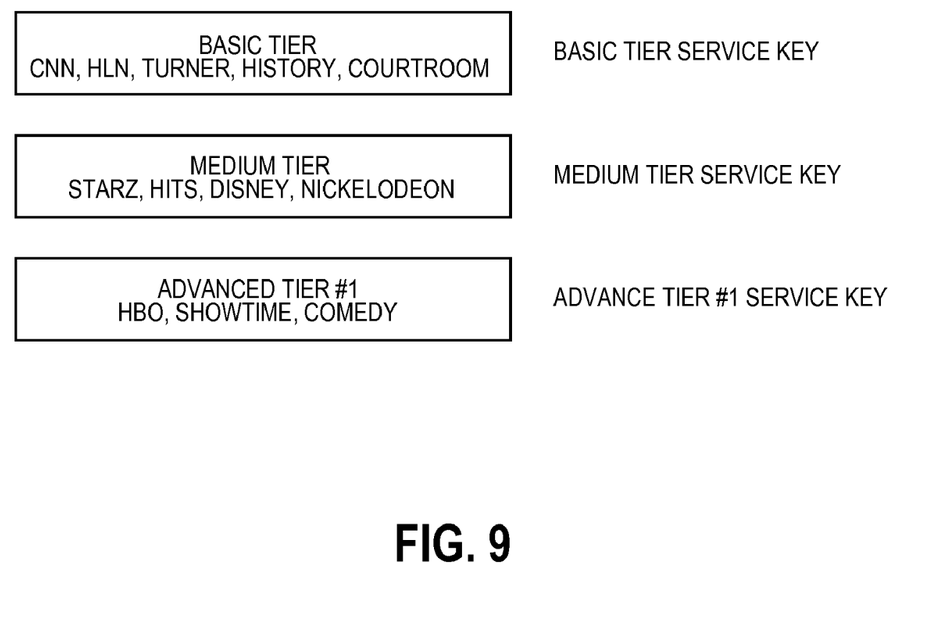
FIG. 9 show embodiments of services that may be delivered to a decoder or a conditional access unit.

Services can be sold a-la-carte or sold as a bouquet or package. There may be several tiers of services. For example, there may be a basic tier of services, a medium tier offering more services, and advanced tiers offering different premium services, as shown in FIG. 9. In this embodiment, each incremental tier of services may be given a separate key.

From Table 1 above, if a customer where to subscribe to 20 different types of Service tiers, that would require 60 bytes of ID storage, 320 bytes of storage of the currently valid Service Keys, 320 bytes of storage for the Service Keys valid for the next epoch (or billing period) for a total of 700 bytes.

Typically, ECMs need to convey the Access Conditions needed to access a channel along with the Channel or Service ID information and Control Word (key) information. In this embodiment, the ECMs can be simplified. Only the Channel or Service ID information, and possibly Program ID if it is a IPPV or VOD program, need to be included in the ECM. This is because no ECM processing other than identifying the appropriate encrypted key from memory, and using it to write it into the appropriate register of the Descrambler IC needs to be performed.

Figure 10:
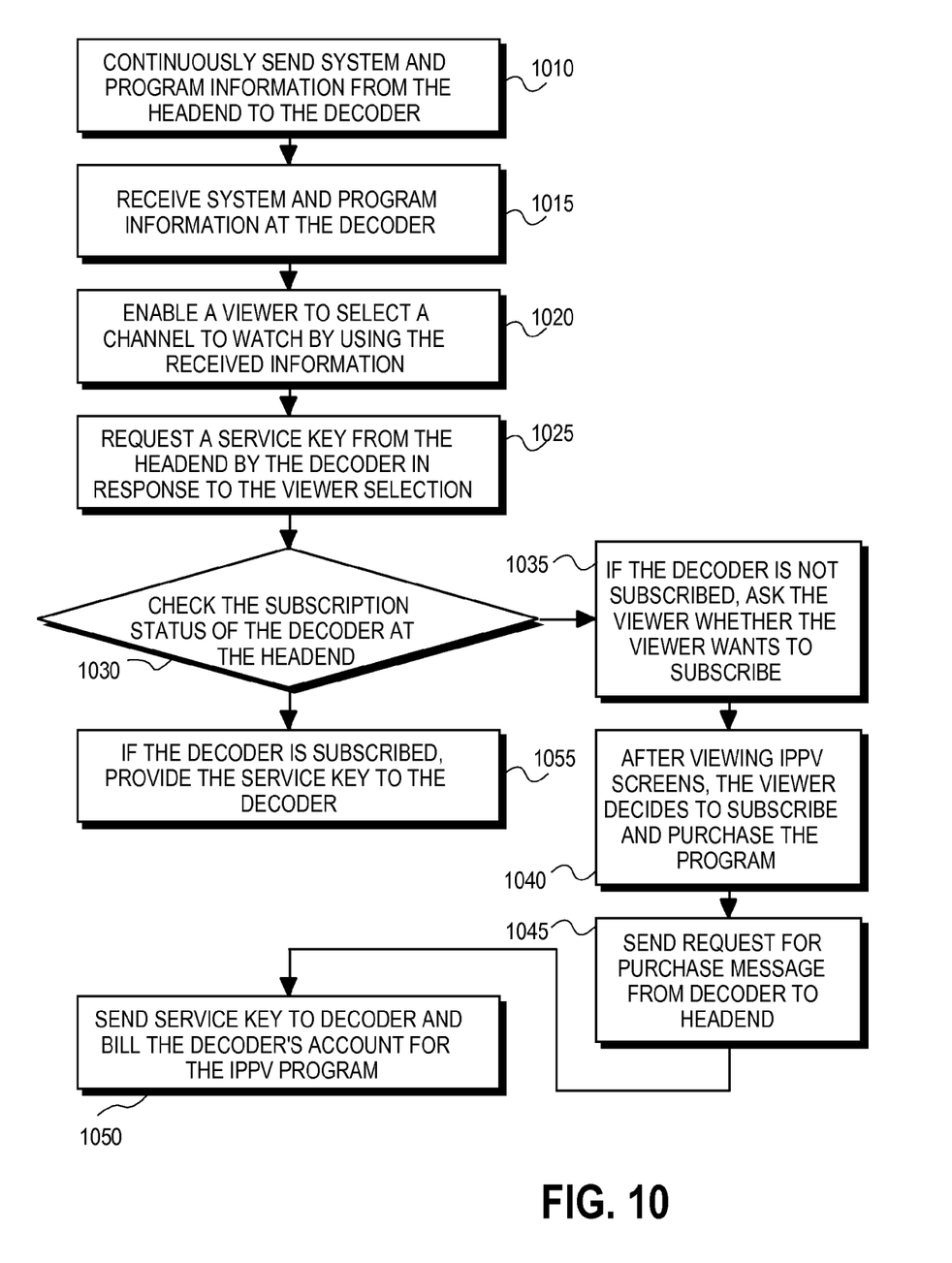
FIG. 10 shows an embodiment of a method for requesting and receiving control words or service keys.

FIG. 10 shows one embodiment of a method for requesting and receiving service keys. Program information is continuously sent from the headend to the decoder, steps 1010 and 1015. A viewer then selects a channel to watch, step 1020. the decoder requests a Service Key from the headend, step 1025. The headend checks the subscription status of the decoder, step 1030. If the decoder is subscribed, the headend provides the Service Key to the decoder, step 1055. If the decoder is not subscribed, the viewer is asked by the decoder to subscribe, 1035. The viewer decides to subscribe, 1040. The decoder sends a request for purchase to the headend, 1045. The headend sends an encrypted Service Key to the decoder, 1050.

Thus, in this embodiment, the decoder includes a Descrambler IC with a Unique Key. Service Keys are delivered to decoder 701 encrypted by the descrambler IC Unique Key and stored in encrypted form in the decoder. Alternatively, the decoder could request a service key each time that the decoder tunes to a channel without storing service keys locally. The Entitlements normally held by the secure cryptographic processor are held by the controlling authority, e.g. a key server in the headend. The insecure processor 730 in decoder 701 may receive a message (e.g., an ECM or an EMM) which tells it what it is authorized to descramble so that it may properly display viewing options to a viewer. The processor 730 can then request service keys for selected channels. In this embodiment, there is no embedded "secure" Firmware or software. Using the hardware decryption circuit mentioned above, an embedded CPU core or firmware that performs a cryptographic function is not needed. This enables a number of conditional access applications which may be downloaded to the insecure processor. The Service Key is unit key encrypted. It may be a public asymmetric key or secret symmetric key.

Additional advantages include Pay-TV applications without using a Cryptographic Processor by providing a decoder having a Descrambler IC with Unique Keys hardwired into the IC. The decoder can request a service key or control word from a network provider. Local Access control can be performed by the Insecure Processor because the critical "secure" function is isolated in the Descrambler IC.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are accordingly to be regarded in an illustrative rather than in a restrictive sense.

What is claimed is:

1. A method of descrambling digital content comprising:
  receiving scrambled digital content in a descrambler integrated circuit, the descrambler integrated circuit including a decryption hardware being a hardware circuit without any software control, the descrambler integrated circuit including a decryption block, a register circuit, and a descrambler;
  receiving an encrypted control word in the descrambler integrated circuit, the encrypted control word is received from a smart card, wherein encrypted control word is obtained by encrypting a control word in the smart card using a key stored in a register circuit of the smart card, wherein the key stored in the register circuit of the smart card is associated with a key stored in the register circuit of the descrambler integrated circuit;
  decrypting the encrypted control word by the decryption block using the key stored in the register circuit of the descrambler integrated circuit; and
  descrambling the scrambled digital content in the descrambler integrated circuit using the decrypted control word.

2. The method of claim 1, wherein the digital content is content contained in a television transmission.

3. The method of claim 1, wherein the digital content is content downloaded from the Internet.

4. The method of claim 1, wherein the control word is decrypted using Triple DES.

5. A descrambler integrated circuit adapted for implementation in a conditional access unit, comprising:
  a memory to permanently store a key uniquely assigned to the descrambler integrated circuit;
  decryption logic coupled to the memory, the decryption logic being hardware without software control that decrypts an encrypted data using the key completely within the descrambler integrated circuit without accessing any information external to the decryption logic, the encrypted data being a service key; and
  a descrambler coupled to the decryption logic, the descrambler to descramble incoming scrambled, digital program data within the descrambler integrated circuit using data recovered by decrypting the encrypted data, wherein the descrambler is being controlled by a processor in communications with a transmitter implemented within the conditional access unit, the transmitter to transmit a request for the service key in the encrypted format to a headend.

6. The descrambler integrated circuit of claim 5, wherein the memory is a one-time programmable non-volatile memory.

7. The descrambler integrated circuit of claim 5, wherein the encrypted data is the service key in an encrypted format being valid for a prescribed period of time, the encrypted service key, when decrypted, to descramble the scrambled digital program data if the digital program data belongs to a selected group of programs each of which capable of being descrambled by the service key.

8. An apparatus comprising:
  a first interface to receive encrypted data; and
  a descrambler integrated circuit in communication with the first interface, the descrambler integrated circuit comprises
    a memory to store a key uniquely assigned to the descrambler integrated circuit,
    decryption logic to decrypt the encrypted data using the key within the descrambler integrated circuit, the decryption logic being hardware that independently performs the decrypt operation without accessing any information external to the decryption logic, and
    a descrambler to descramble incoming scrambled, digital content within the descrambler integrated circuit using data recovered by decrypting the encrypted data, wherein the descrambler is being controlled by a processor in communications with a transmitter implemented within the apparatus, the transmitter to transmit a request for the encrypted data to a headend.

9. The apparatus of claim 8, wherein the first interface includes an expansion slot to receive a smart card.

10. The apparatus of claim 8, wherein the encrypted data is an encrypted control word.

11. The apparatus of claim 8, wherein the memory of the descrambler integrated circuit is configured to prevent the permanent key from being overwritten or from being read by a source external to the descrambler integrated circuit.

12. The apparatus of claim 8, wherein the descrambler integrated circuit is devoid of a central processing unit, software or firmware.

13. The apparatus of claim 8 is a conditional access unit.

* * * * *